March 24, 1931.                D. SWEENEY                1,797,968
ORNAMENTAL CHAIN
Filed Nov. 9, 1927
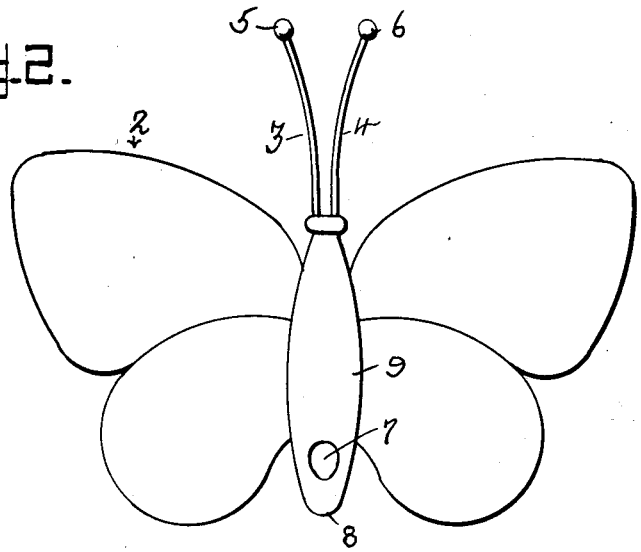
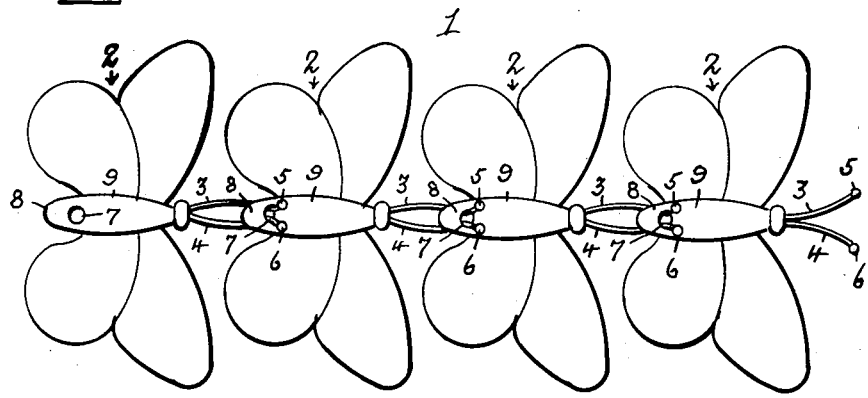
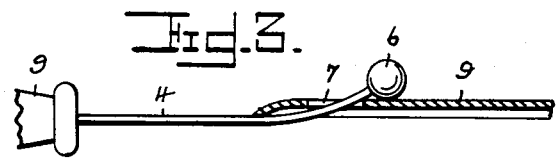
Inventor
Dennis Sweeney.

Patented Mar. 24, 1931

1,797,968

UNITED STATES PATENT OFFICE

DENNIS SWEENEY, OF FARMINGDALE, NEW YORK

ORNAMENTAL CHAIN

Application filed November 9, 1927. Serial No. 232,166.

This invention relates to improvements in necklaces, belts, braclets, and the like, and has for its object to provide a device of this nature formed of a series of detachably connected members whereby the length of the chain may be adjusted to the purpose desired.

Another object of the invention is to provide a combination tiara, neck band, necklace, bracelet, or belt, and which may be quickly changed from one to the other by adding to or removing detachable sections therefrom.

With the above and such other objects in view as may hereinafter more fully appear, I have invented the device shown in the accompanying illustration, in which:

Figure 1 is an elevational view of a hand chain, made according to my invention;

Figure 2 is an enlarged detail view of a detachable section of the chain; and

Figure 3 is an enlarged view showing the method of connecting sections of the chain.

Like reference characters indicate like parts throughout the following specification and in the several views in the drawings in which 1 indicates a chain, formed of a series of detachably connected members 2, which may be made of flat sheet metal or other suitable material, said members, in the showing, being in the form of butterflies, the antennæ 3 and 4 of which are formed of spring wire and terminate in half balls or knobs 5 and 6, said balls being adapted to be sprung together, as indicated in Figure 3, to be projected through the opening 7, in the rear end 8, of the body 9 of an adjoining section or member, after which they will spread and hold the sections together.

It will thus be seen that a chain of these butterflies may be made of any desired length and very quickly at that. Further, the sections or butterflies may be made in different colors and alternated in a belt, girdle, or necklace, or all of a color, selected from the chain for a tiara, neckband, or bracelet, or certain desired combinations may be selected for a chain to be used to match certain clothing, and all at the one expense of a single chain. It is obvious that other antenna-bearing insects may be substituted for the butterflies.

Having described my invention that which I claim to be new and desire to procure by Letters Patent is:

1. A chain formed of a series of substantially solid body members, each having an apertured tail end, a pair of elongated head members projecting through the aperture of an adjoining member, said head members being in the form of antennæ, said antennæ being independent of one another and terminating at the free ends in normally spaced apart ball terminals.

2. The combination as set forth in claim 1, said antennæ being resilient.

3. The combination as set forth in claim 1, said antennæ being resilient, and upwardly curved at the ball ends.

4. In a chain, a series of solid link members, each having an aperture in one end, wires projecting from the other end for engagement in said aperture of the adjoining member, said member simulating butterflies, said wires simulating antennæ and being resilient and normally spaced apart.

5. The combination as set forth in claim 4, and ball tips for said wires for locking the same within said apertures.

6. A device of the character described comprising a body member formed of a single thickness of substantially flat sheet metal having an aperture in one end and antennæ shaped projections extending from the other end, to engage in the aperture of an adjoining member said antennæ being resilient.

7. The combination set forth in claim 6, said antennæ being formed of wire, said wire being resilient.

8. The combination set forth in claim 6, said antennæ being formed of wire, said wire being resilient, and terminating in ball ends.

9. The combination set forth in claim 6, said antennæ being formed of wire, and terminating in ball ends, said ball ends being normally spaced apart.

10. The combination set forth in claim 6, said antennæ being formed of wire, said wire being resilient, and terminating in ball ends, said ball ends being normally spaced apart, to form locking means for detachably connecting one member to another.

In testimony whereof I affix my signature.

DENNIS SWEENEY.